United States Patent [19]

Sato

[11] Patent Number: 4,501,013
[45] Date of Patent: Feb. 19, 1985

[54] CAR STEREO SET

[75] Inventor: Masaaki Sato, Hachioji, Japan

[73] Assignee: Olympus Optical Co., Ltd., Tokyo, Japan

[21] Appl. No.: 185,804

[22] Filed: Sep. 10, 1980

[30] Foreign Application Priority Data

| Sep. 18, 1979 | [JP] | Japan | 54-119720 |
| Sep. 18, 1979 | [JP] | Japan | 54-119721 |
| Sep. 18, 1979 | [JP] | Japan | 54-119722 |
| Sep. 18, 1979 | [JP] | Japan | 54-119724 |
| Sep. 18, 1979 | [JP] | Japan | 54-119725 |
| Sep. 18, 1979 | [JP] | Japan | 54-119726 |
| Sep. 18, 1979 | [JP] | Japan | 54-119727 |
| Sep. 18, 1979 | [JP] | Japan | 54-119728 |
| Sep. 18, 1979 | [JP] | Japan | 54-119729 |
| Sep. 18, 1979 | [JP] | Japan | 54-119730 |
| Sep. 18, 1979 | [JP] | Japan | 54-119731 |
| Sep. 18, 1979 | [JP] | Japan | 54-119732 |

[51] Int. Cl.³ .................. H04R 5/00; H04R 1/00
[52] U.S. Cl. ........................... 381/86; 455/345
[58] Field of Search .......... 179/1 VE, 1 G; 455/151, 455/152, 345, 346; 381/1, 86

[56] References Cited

U.S. PATENT DOCUMENTS

| 2,071,398 | 2/1937 | Frantz et al. | 455/346 |
| 2,133,151 | 10/1938 | Rittenhouse | 179/1 VE |
| 2,973,431 | 2/1961 | Sontheimer | 455/152 |
| 3,103,630 | 9/1963 | Pitts et al. | 455/346 |
| 4,100,372 | 7/1978 | Hypolite | 179/1 VE |
| 4,248,069 | 2/1981 | Burbank | 455/345 X |

OTHER PUBLICATIONS

Lafayette Christmas Catalog 1978 p. 41, "Panasonic 'Classic'".

Primary Examiner—R. J. Hickey
Attorney, Agent, or Firm—Frishauf, Holtz, Goodman & Woodward

[57] ABSTRACT

A car stereo set is disposed in a dead space inside a car which can be reached by a person sitting on the rear seat of the car, e.g. a central armrest, side armrest, rear side wall, or the back of a front seat. The car stereo set may be reduced to unit configuration so that it may start a sound reproduction operation immediately when it is inserted into a receptacle formed inside or outside the car. Further, the car stereo set may include a pair of car stereo units (both of which include a tape recorder) and a stereo switching mechanism. When a cassette tape is inserted into the tape recorder of one unit reproduction of the other car stereo unit is interrupted, a cassette tape inside the tape recorder of the other unit is ejected, and a reproduction operation based on the newly inserted cassette is started.

14 Claims, 35 Drawing Figures

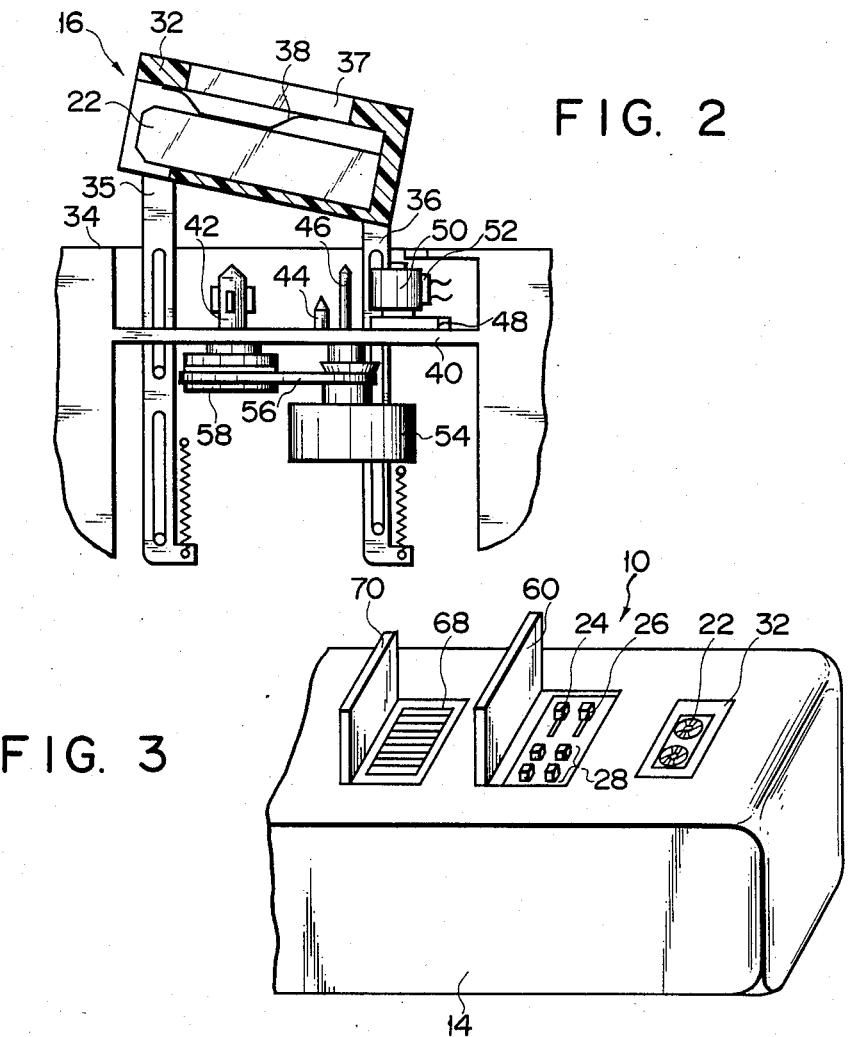
FIG. 2
FIG. 3
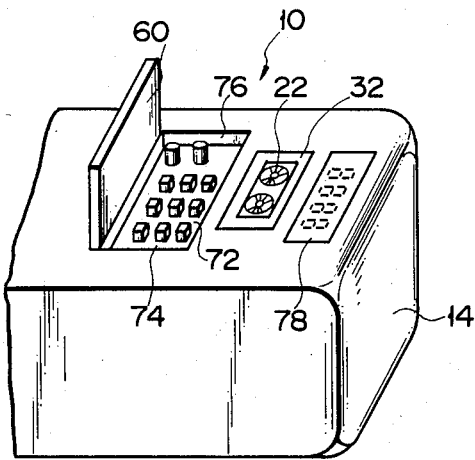
FIG. 4

CAR STEREO SET

BACKGROUND OF THE INVENTION

This invention relates to a car stereo set.

Generally, in a prior art car stereo set, a tape recorder mechanism is installed in the dashboard or front console box of a car, and a pair of speakers are disposed on the rear parcel tray. With such conventional arrangement, only a person sitting on a front seat can perform all the operations including the volume, tone, and balance adjustments as well as the cassette replacement, while a person sitting on the rear seat cannot perform any of these operations because it is difficult for him even to touch the tape recorder mechanism. As a result, the person on the rear seat cannot enjoy his desired music from a magnetic tape under the optimum conditions. Accordingly, a driver on a front seat must operate the tape recorder mechanism in advance or under instructions from the person on the rear seat. Thus, the driver will possibly become careless in driving and besides find it difficult to catch the fancy of the person behind him.

Moreover, the interior of cars tends to be narrowed or degenerated in amenity due to the reduction of car bodies in size and weight, conversion to electronic equipment, measures to counter car crashes, installation of telephone, television, car cooler and other provisions, etc. The dashboard and console box occupy the most precious space in a car, so that location of the tape recorder mechanism of the car stereo set in such space will make it hard to realize the aforesaid reduction of size and weight, installation of telephone, etc. Generally, a tuner and other related components (tuning indicator, control unit, etc.) of a car radio mechanism are provided inside the dashboard or front console box of a car as well as the tape recorder mechanism. Therefore, the car radio mechanism shares its drawbacks in common with the tape recorder mechanism.

Unless originally provided as integrated parts, moreover, a car stereo set is purchased simultaneously with or after the purchase of cars to be furnished therewith. Considering the complexity of the electric wiring for the car stereo sets, most users give up the idea of mounting the sets in their cars for themselves, and entrust the sellers with the installation at their own expense. With the spread of component-type car stereo sets, users have recently developed a tendency to purchase and set up decks, amplifiers, tuners, graphic equalizers, etc. independently. This tendency augments the complexity of the electric wiring, further complicating the users' installation.

Conventionally, a prior art car stereo set is fixed in a car, and cannot be attached and detached with ease. However, such car stereo set is limited to use inside the car, and is never used by a person outside the car or in the open air. Presently, car stereo sets are increasing in price as well as quality due to the tendency toward the conversion to the car-component or car-audio system. Thus, users are obliged to defray increased expenses for system components for indoor use and stereo radio-cassettes for outdoor use. This is attributable to a fact that the prior art car stereo sets have a narrow range of applications; they are used only inside the cars and are never used in combination with indoor-use system components or outdoor-use stereo radio-cassettes.

SUMMARY OF THE INVENTION

It is therefore an object of this invention to provide a car stereo set capable of being operated by a person sitting on the rear seat of a car.

It is another object of the invention to provide a car stereo set capable of easy installation inside a car.

It is still another object of the invention to provide a car stereo set usable both inside and outside a car.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTON OF THE DRAWINGS

FIG. 2 is a side view of an example of a tape recorder mechanism;

FIG. 3 is an enlarged perspective view of the car stereo set shown in FIG. 1;

FIG. 4 is an enlarged perspective view of a car stereo set resembling the one shown in FIG. 3 and including a car radio mechanism as well as a tape recorder mechanism;

DETAILED DESCRIPTION OF THE PREFERRED EMBODIMENTS

Figure 1:
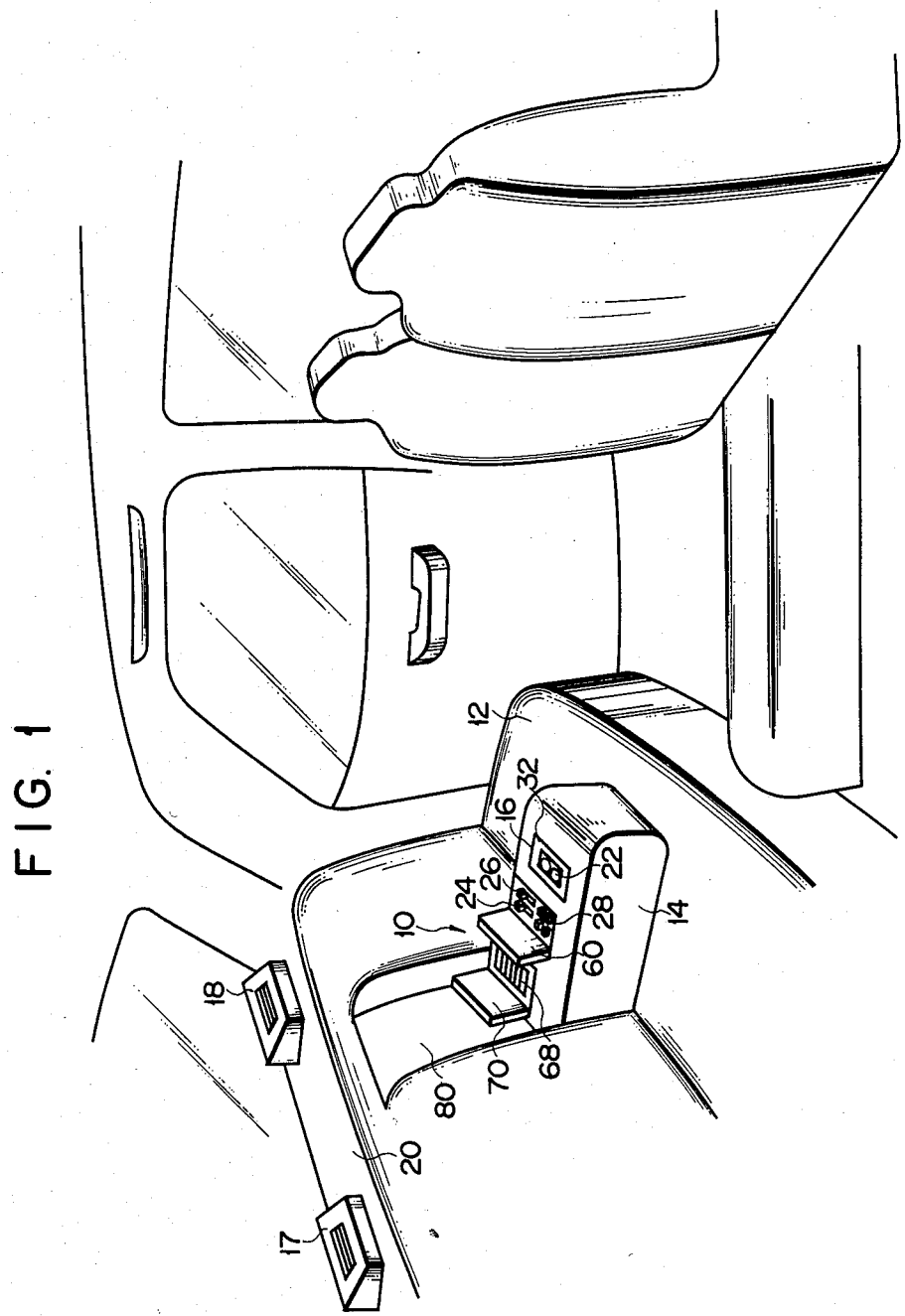
FIG. 1 is a perspective view of a car stereo set according to a first embodiment this invention mounted on a central armrest of a rear seat of a car.

Referring to FIG. 1, there is shown a car stereo set 10 according to a first embodiment of the present invention in which a tape recorder mechanism 16 for reproduction of a magnetic tape is mounted on a central armrest 14 in the center of a rear seat 12. A pair of speaker boxes 17 and 18 for the tape recorder mechanism 16 are disposed on both sides of a rear parcel tray 20.

A cassette tape recorder mechanism may, for example, be utilized as the tape recorder mechanism 16. With the tape recorder mechanism 16, for reproducing a magnetic tape, mounted on the central armrest 14 of the rear seat 12, a person or user sitting on the rear seat can freely set or replace a cassette tape 22 and operate a volume knob 24, a balance knob 26, and various control buttons 28 (eject button, FF button, REW button and channel changing button) to enjoy his favorite music or other sounds under the optimum conditions. The volume knob 24, balance knob 26 and control buttons 28 constitute part of the tape recorder mechanism. The car stereo set of such type is particularly suited to automobiles provided, for example, for high government officials or high executives of companies.

Various conventional mechanisms can be utilized for the tape recorder mechanism 16. FIG. 2 shows an example of a cassette tape recorder mechanism as the tape recorder mechanism 16. In this cassette tape recorder mechanism, a cassette holder 32 for the cassette tape 22 is in the form of a "kangaroo-pocket" supported by a pair of guide levers 35 and 36 which extend from the outside wall 34 of the cassette tape recorder mechanism. The cassette tape 22 inside the cassette holder 32, which is pressed against the inside wall of the cassette holder 32 by means of a cassette biasing spring 38, can be viewed from the outside through a transparent window 37. Located horizontally, a chassis 40 bears thereon a pair of cassette guide pins (only one cassette guide pin 44 is shown in FIG. 2), a pair of reel shafts (only a take-up reel shaft 42 is shown) and a capstan shaft 46. A pinch roller 50 and a magnetic head 52 are attached to a slide lever 48 which slides on the chassis 40. Driving force is transmitted from a motor (not shown) to a flywheel 54 mounted on the capstan shaft 46, and the driving force from the flywheel is further transmitted to a pulley 58 on the take-up reel shaft 42. The specific operation of the cassette tape recorder mechanism will not be described herein since it is conventional and does not constitute any essential part of the present invention.

FIG. 3 is an enlarged view of the central armrest 14 of the rear seat on which the tape recorder mechanism 16 is mounted. After setting the cassette tape 22 in the cassette holder 32, the person sitting on the rear seat may open a hinged cover 60 and operate the volume knob 24, balance knob 26 and control buttons 28 to enjoy his desired sounds at his option under the optimum conditions.

Moreover, a driver or chauffeur can be released from the worry about operating the tape recorder mechanism in advance or under instructions from the person sitting on the rear seat, so that he will be able to be intent on his driving, that is, to drive carefully.

The car stereo set 10 can be miniaturized by using micro-cassette tapes for the cassette tapes. A number of cassette tapes 22 are stored in a cassette storage chamber 68, and the user can open a hinged cover 70 to choose his desired one among the cassette tapes stored in the chamber 68.

Further, the car stereo set 10 may be provided with a car radio mechanism 72 integrated with the tape recorder mechanism 16 (see FIG. 4). With a tuner 74 of the car radio mechanism 72 mounted on the central armrest 14, the person on the rear seat can freely enjoy stereo performances in an FM broadcast.

Control buttons for the tuner 74, as well as the control buttons for the tape recorder mechanism 16, are preferably incorporated as a unit into a combination control panel 76 as shown in FIG. 4, thereby improving the operating efficiency. While operating the tuner 74, the frequency is indicated at an LED or liquid-crystal frequency indicator section 78 which normally indicates the time as part of a digital clock. Naturally, the central armrest 14 can be hidden away in a recess 80 in the rear seat 12 (see FIG. 1).

The tuner 74 will not be described in detail herein since it can be any suitable, conventional tuner.

According to the invention, the tape recorder mechanism of the car stereo set need only be disposed in a dead space inside the car which has not effectively been utilized so far, and which can easily be reached by a person sitting on the rear seat.

Figure 5:
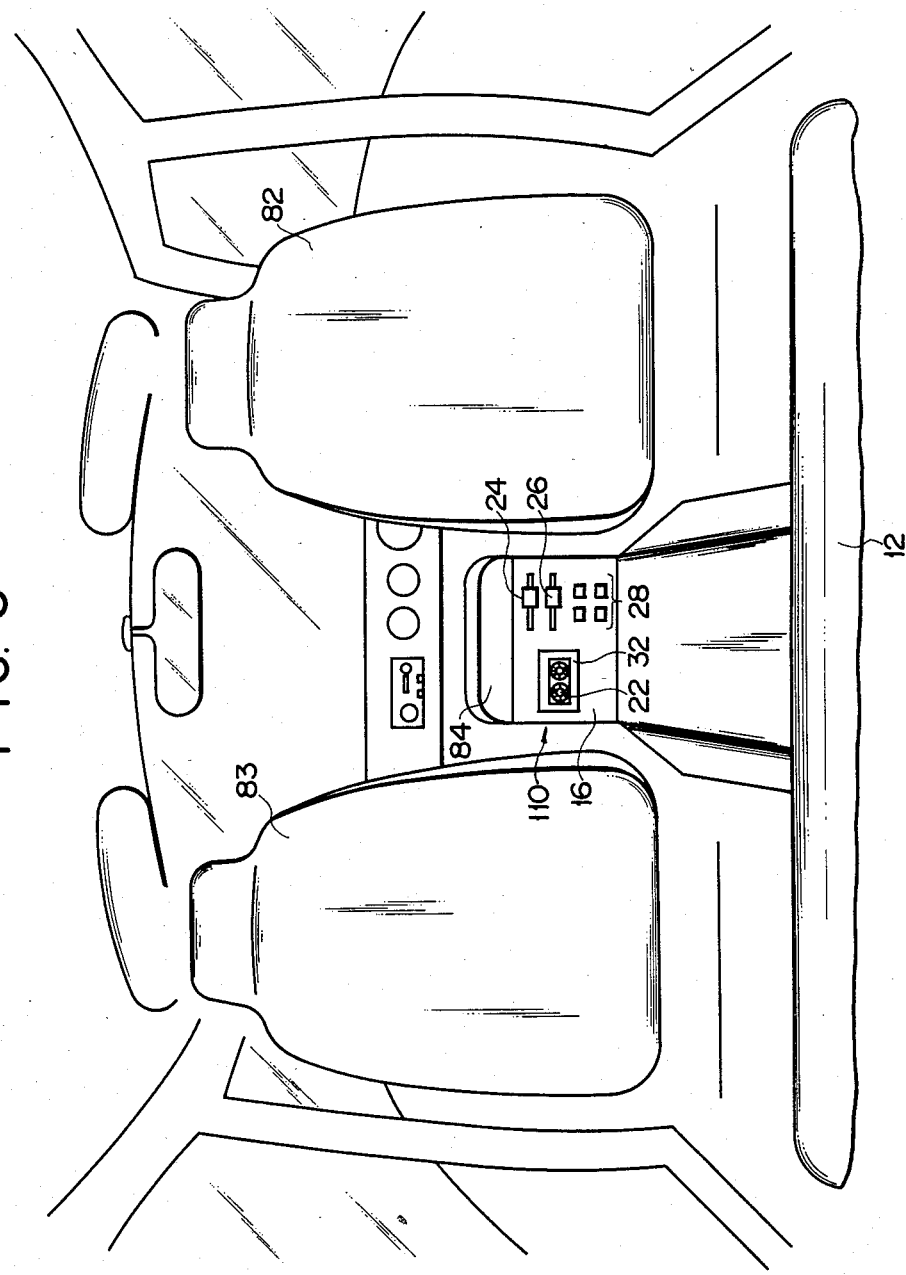
FIG. 5 is a front view of a car stereo set according to a second embodiment of the invention mounted on a central console box.
Figure 6:
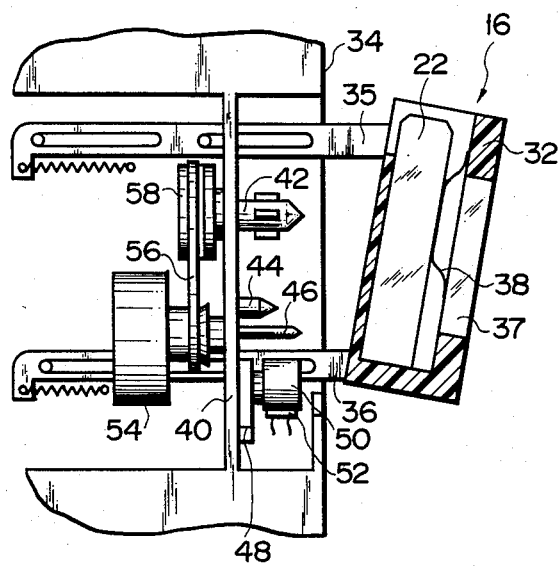
FIG. 6 is a side view of an example of the tape recorder mechanism.
Figure 7:
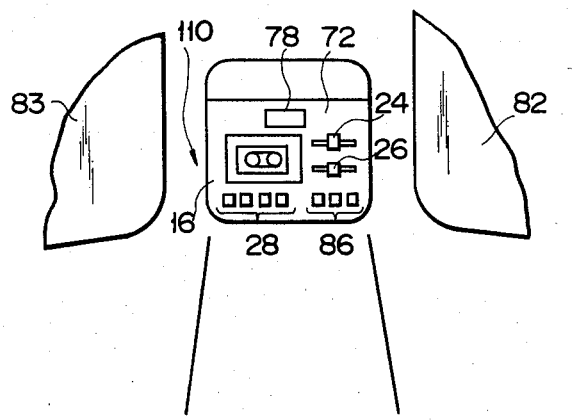
FIG. 7 is a front view of a car stereo set resembling the one shown in FIG. 5 and including a car radio mechanism as well as a tape recorder mechanism.

In a second embodiment shown in FIG. 5, the back of a central console box 84 located between front seats 82 and 83 is chosen for the dead space. Namely, in this embodiment, a tape recorder mechanism 16 for reproducing a magnetic tape in a car stereo set 110 is mounted on the back of the central console box 84. Whereas the chassis is disposed horizontally in the tape recorder mechanism of the first embodiment, a chassis 40 of the tape recorder mechanism 16 of the second embodiment is disposed vertically with the cassette inlet of a cassette holder 32 opening upward, as shown in FIG. 6. The car stereo set 110 may incorporate a car radio mechanism together with the tape recorder mechanism 16 (see FIG. 7). The tuner of the car radio mechanism may be operated by means of a associated control buttons 86.

Figure 8:
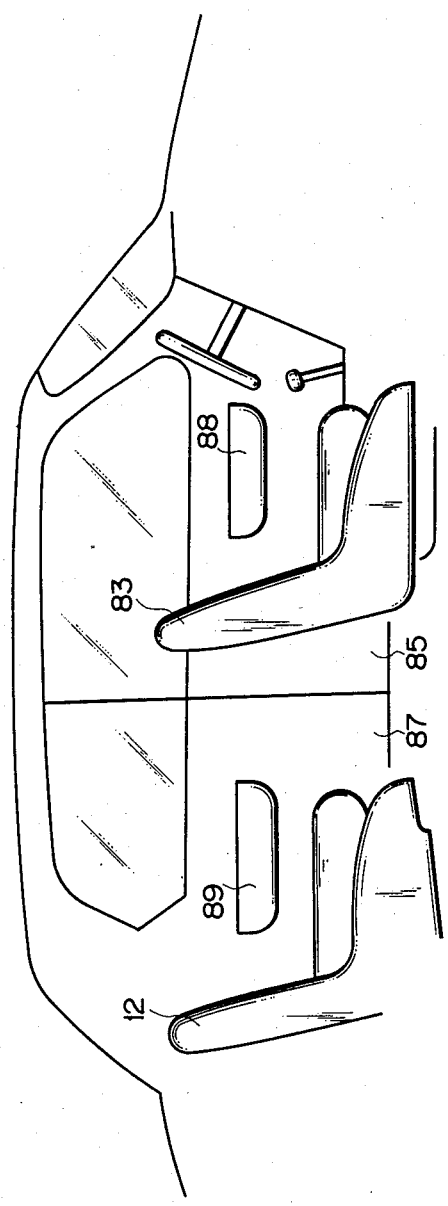
FIG. 8 is a schematic view of the interior of a car as taken from the right-hand side to the left-hand side of the car.
Figure 9:
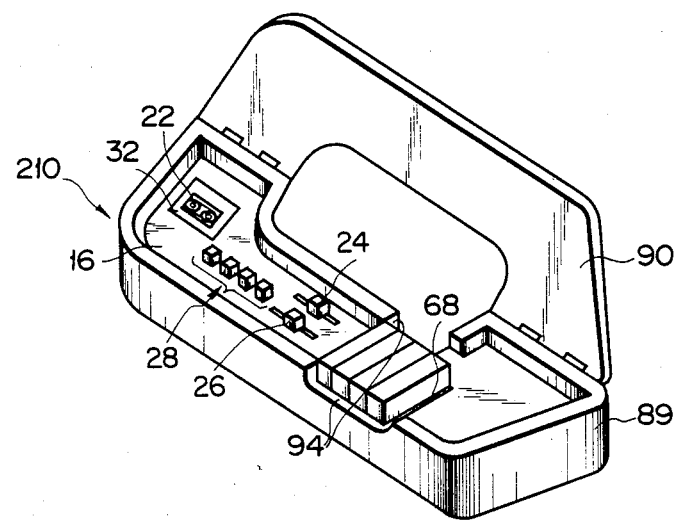
FIG. 9 is an enlarged perspective view of a car stereo set according to a third embodiment of the invention mounted on a side armrest.
Figure 10:
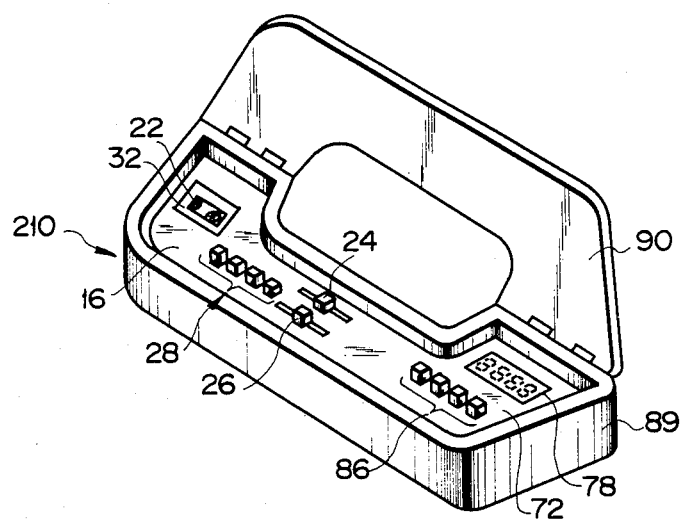
FIG. 10 is an enlarged perspective view of a car stereo set resembling the one shown in FIG. 9 and including a car radio mechanism as well as a tape recorder mechanism.

In a third embodiment shown in FIGS. 8 to 10, an armrest on the side wall of the car is chosen for the dead space.

In a regular automobile, a pair of armrests 88 and 89 corresponding respectively to front and rear seats 83 and 12 are attached to the left-hand side wall. Naturally, another pair of armrests (not shown) are attached to the right-hand side wall in the same manner. The armrest 88 serves also as a door-knob of a front door 85. In the case of a four-door car, moreover, the armrest 89 serves also as a door-knob of a rear door 87. In a car stereo set 210 according to a third embodiment, the aforementioned tape recorder mechanism 16 is incorporated in at least one armrest, e.g. the armrest 89, as shown in FIG. 9. The tape recorder mechanism 16 can be screened from the outside by a hinged cover 90 disposed on the top of the armrest 89. In using the tape recorder mechanism 16, the cover 90 is opened, the cassette tape 22 is set in a cassette holder 32, and a volume knob 24, a balance knob 26, and various control buttons 28 (eject button, FF bubbon, REW button and channel changing button) are operated. A recess is defined in part of the armrest 89 to form a cassette storage chamber 68. Since a notch 94 is formed in each side wall of the cassette storage chamber 68, cassette tapes may easily be taken out from the chamber 68.

By additionally incorporating the car radio mechanism into the armrest, the space inside the car may be utilized with increased efficiency to improve the safety and amenity of the car. The tuner of the car radio mechanism may be set in the armrest in which the tape recorder mechanism 16 of the car stereo set 210 is contained, or in another armrest. FIG. 10 shows a modified example in which the tuner is incorporated in one and the same armrest 89. In the armrest 89, the tuner of the car radio mechanism and the tape recorder mechanism 16 are disposed on the right and left sides, respectively. The tuner may be adjusted by suitably operating a plurality of control buttons 86, and the frequency of the tuner is indicated at an LED or liquid-crystal frequency indicator section 78. Like the tape recorder mechanism 16, the tuner is preferably arranged to be covered. In the example of FIG. 10, both the tape recorder mechanism 16 and the tuner can be screened or concealed by a single cover 90. If the tuner output is too high for the main amplifier and equalizer amplifier to be contained in the armrest, then only the head amplifier or preamplifier will be incorporated in the armrest, and the main amplifier, etc. will be disposed under the seat.

Figure 11:
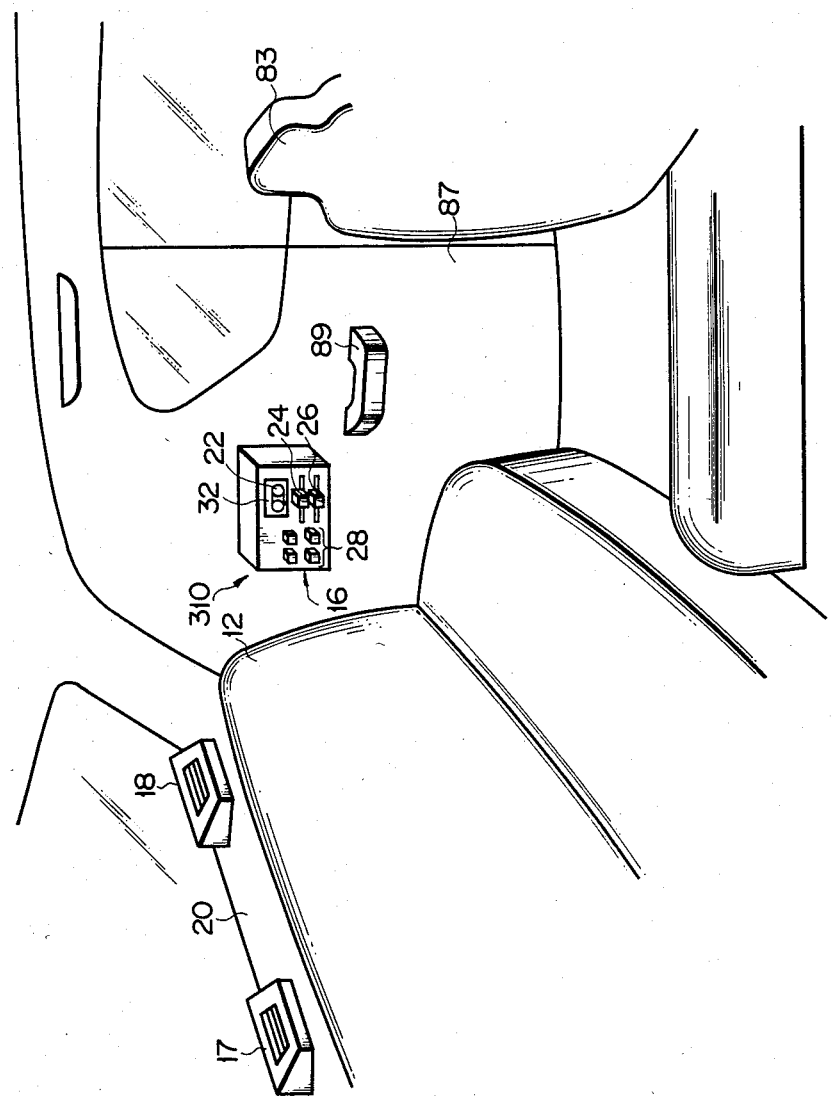
FIG. 11 is a perspective view of a car stereo set according to a fourth embodiment of the invention mounted on a rear side wall.
Figure 12:
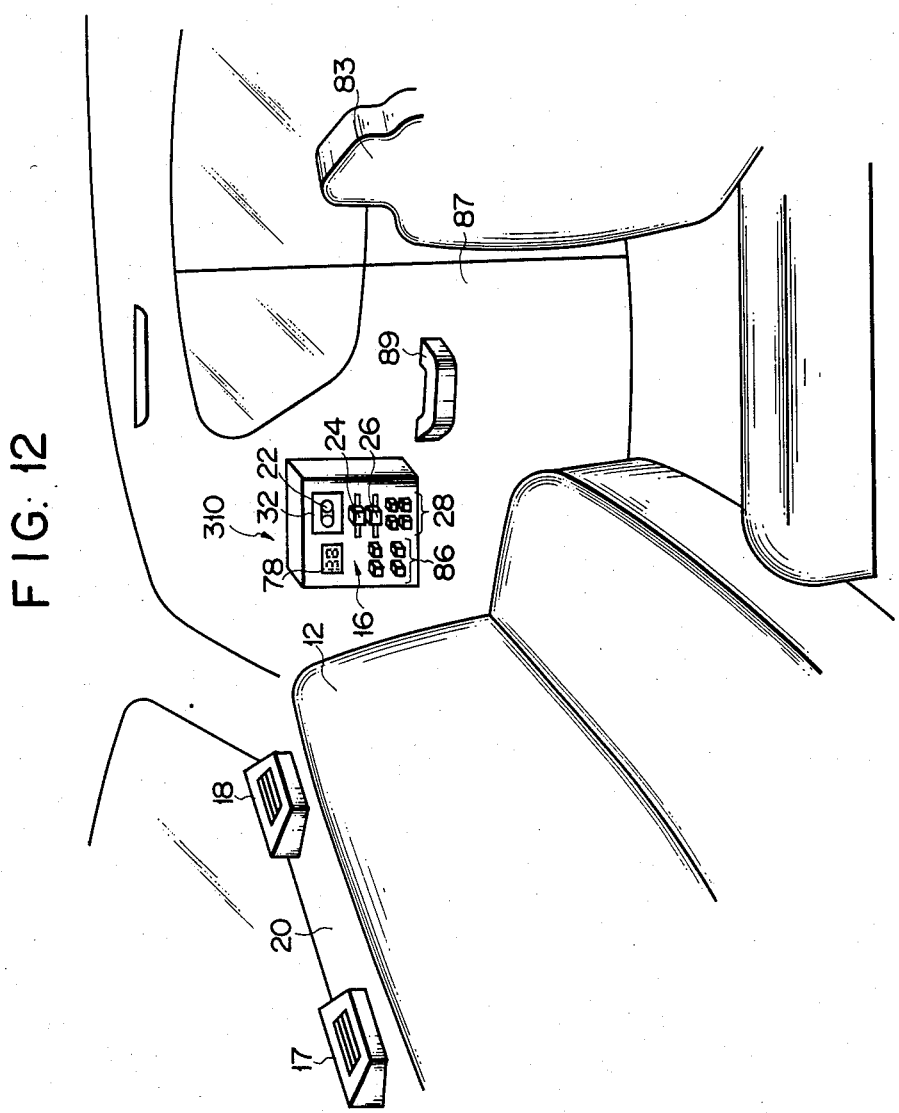
FIG. 12 is a perspective view of a car stereo set resembling the one shown in FIG. 11 and including a car radio mechanism as well as a tape recorder mechanism.

According to a fourth embodiment, as shown in FIG. 11, a car stereo set 310 is mounted on a side wall beside a rear seat 87, that is, on a rear side wall. Like the foregoing embodiments, the car stereo set 310 can incorporate a car radio mechanism as well as a tape recorder mechanism (see FIG. 12).

Figure 13:
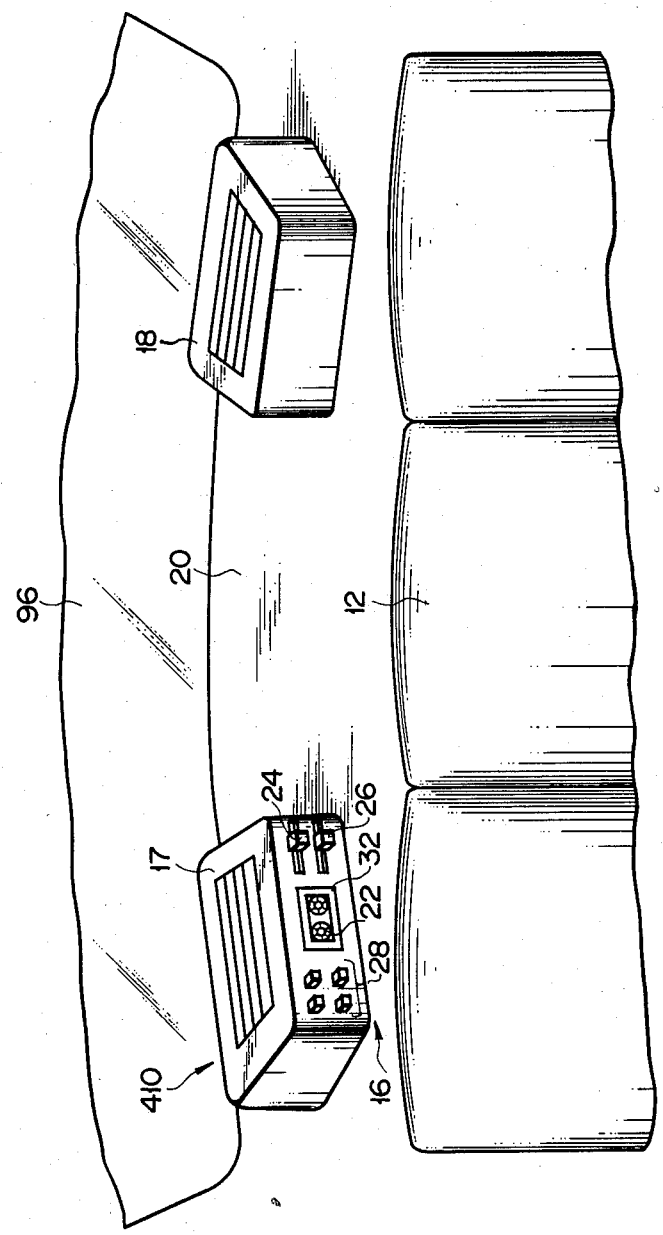
FIG. 13 is a perspective view of a car stereo set according to a fifth embodiment of the invention mounted on the rear parcel tray.
Figure 14:
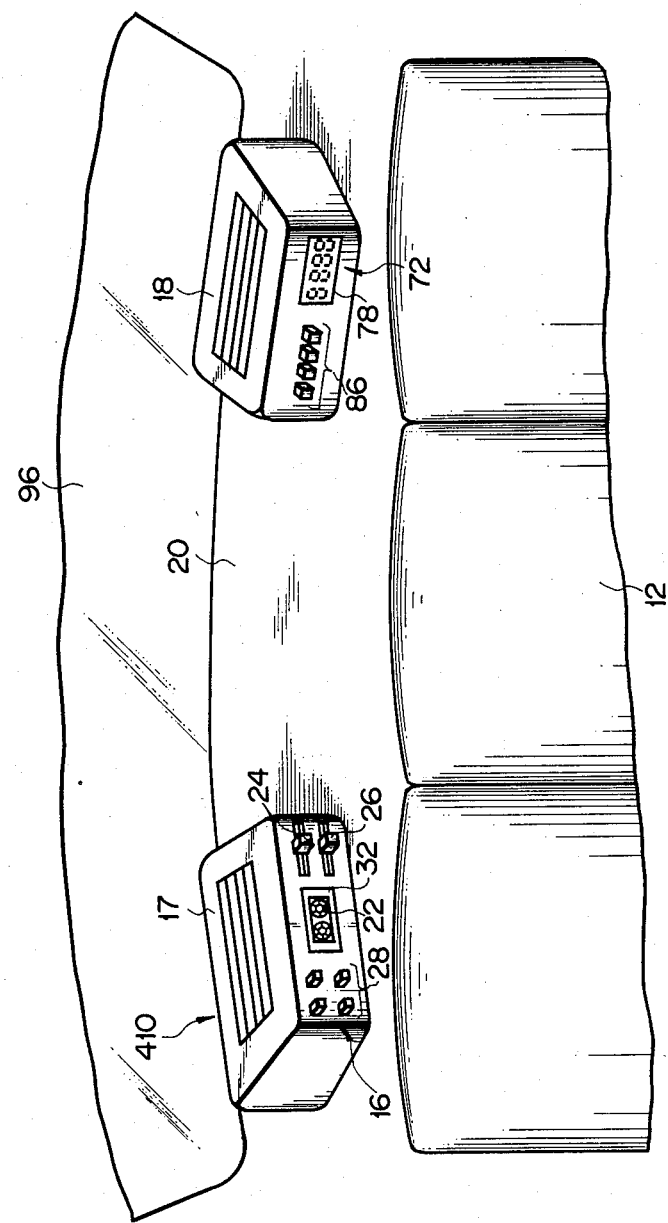
FIG. 14 is a perspective view of a car stereo set resembling the one shown in FIG. 13 and including a car radio mechanism as well as a tape recorder mechanism.

Alternatively, a speaker box may be utilized for the dead space. Namely, as shown in FIG. 13, a pair of speaker boxes 17 and 18 are mounted on a rear parcel tray 20 between a rear seat 12 and a rear window 96, and a car stereo set 410 according to a fifth embodiment can be mounted on one of these speaker boxes, e.g. the speaker box 17. Further, a car radio mechanism is preferably mounted on the other speaker box, namely the speaker box 18 (see FIG. 14). As compared with the car stereo set mounted on the side armrest of the rear seat or the rear side wall, the car stereo set 410 installed in the speaker box can reduce the space occupied by protrusions from the rear side wall.

Figure 15:
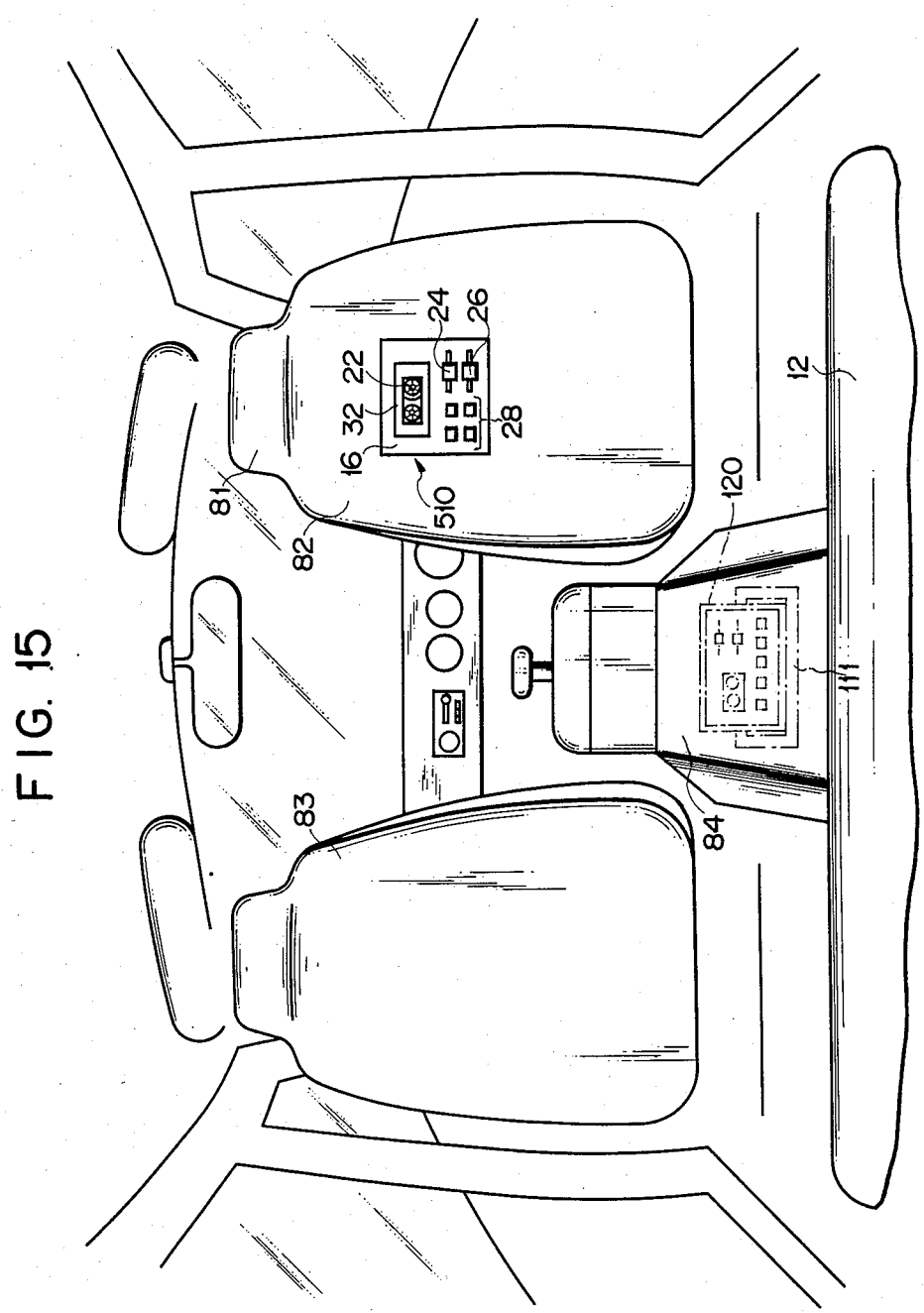
FIG. 15 is a front view of a car stereo set according to a sixth embodiment of the invention mounted on the back of a front seat.
Figure 16:
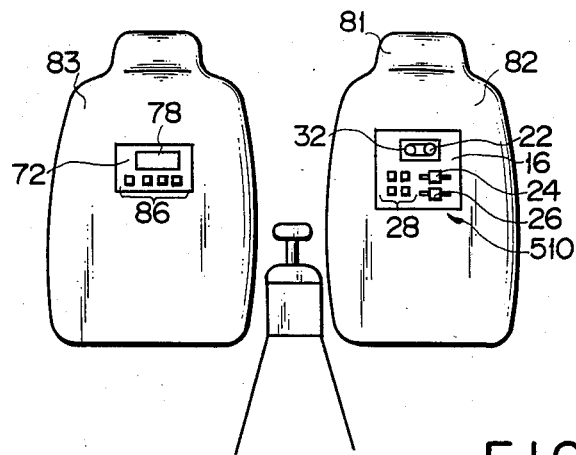
FIG. 16 is a front view of a car stereo set comprising a tape recorder mechanism and a car radio mechanism mounted on separate front seats.
Figure 17:
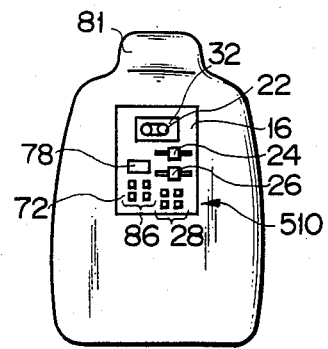
FIG. 17 is a front view of a car stereo set comprising a tape recorder mechanism and a car radio mechanism mounted on one and the same front seat.

In a car stereo set 510 according to a sixth embodiment shown in FIG. 15, a tape recorder mechanism 16 is mounted on the back of the front seat 82 which has a headrest 81. Besides the tape recorder mechanism 16, a car radio mechanism 72 is preferably mounted on the back of the front seat 82. Alternatively, the car radio mechanism 72 may be mounted on the back of the other front seat 83 as shown in FIG. 16, or mounted as a unit with a tape recorder mechanism 16 on the back of one and the same front seat 82. If necessary, the car radio mechanism only may be mounted on the back of a front seat.

Preferably, the car stereo set is reduced to a unit configuration, and a pair of receptacles are disposed inside the car so that a reproduction operation may be started immediately when such a car stereo unit is set in one of the receptacles. In general, the receptacles are disposed in a dead space inside the car which can be reached by a person sitting in the rear seat, and a space inside the car which can be reached by a person sitting in a front seat, respectively.

Figure 18:
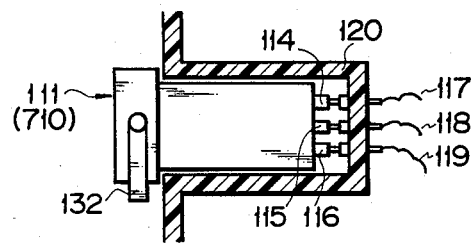
FIG. 18 is a side view of a unit-type car stereo set according to a seventh embodiment of the invention set in a receptacle of a car.
Figure 19:
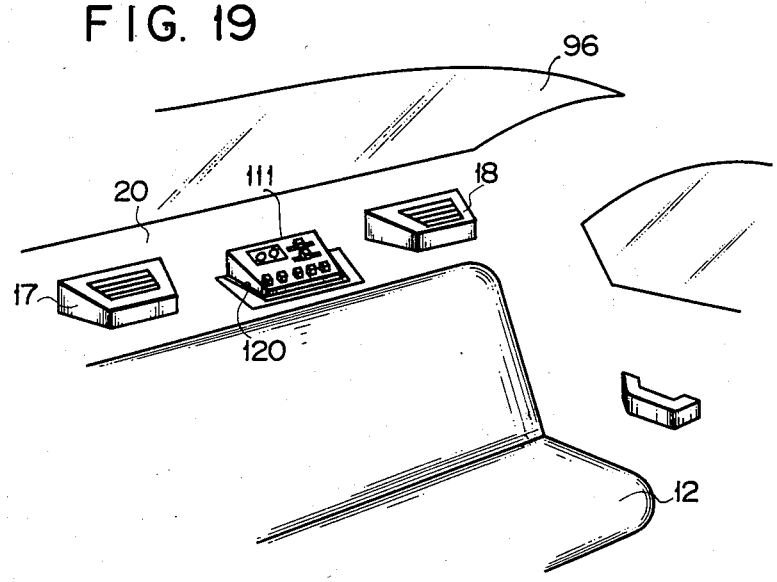
FIG. 19 is a perspective view of the car stereo set of FIG. 18 attached to a receptacle in the rear parcel tray.
Figure 20:
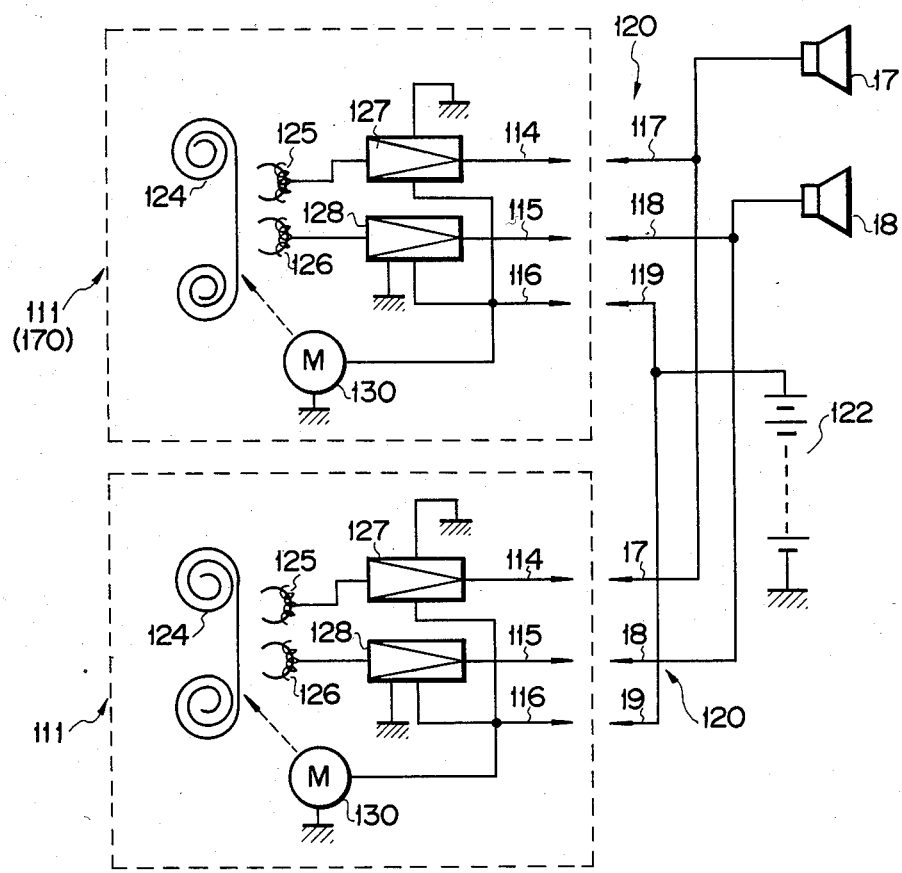
FIG. 20 is an electric circuit diagram for the car stereo set shown in FIG. 18.

As seen from FIG. 18, for example, a unit-type car stereo set 111 according to a seventh embodiment includes on the back a pair of connectors 114 and 115 for speakers and a connector 116 for power supply. Fixed connectors 117, 118 and 119 arranged to connect with the connectors 114, 115 and 116 are attached to each receptacle 120 disposed inside the car. Two such receptacles 120 can, for example, be disposed in the rear parcel tray 20 and the back of the central console box 84, respectively. Tape reproduction operation can be started immediately when the car stereo unit 111 is set in the receptacle 120 of the rear parcel tray 20 or of the central console box 84. The states when the car stereo unit 111 is attached to the two receptacles 120 so located are shown in FIGS. 19 and 15, respectively. In each of the receptacles 120, the fixed connectors 117 and 118 are connected respectively to the speakers 17 and 18 (see FIG. 20) on the rear parcel tray 20, and the fixed connector 119 is connected to a power source 122. As shown in FIG. 20, the connectors 114 and 115 on the car stereo unit side are connected to amplifiers 127 and 128 that are connected with magnetic heads 125 and 126 in contact with a tape 124, and the connector 116 is connected to a motor 130. In FIG. 18, a swingable handle 132 is used for transferring the car stereo unit from one receptacle to the other. The receptacle 120 may be disposed in the back of the front seat, side armrest, central armrest or dashboard, as well as in the console box and rear parcel tray.

According to the seventh embodiment, as described above, the unit-type car stereo set, i.e. the car stereo unit, can be installed in the car with ease. At least two receptacles capable of receiving the car stereo unit are separately disposed in a car. Accordingly, a person sitting in the rear seat, as well as a driver and an assistant driver in the front seats, can set the car stereo unit in one of these receptacles, e.g. the one in the rear parcel tray, to enjoy stereo performances. Thus, with low-priced receptacles properly disposed in a plurality of positions inside the car, the use of a single car stereo unit can provide the same effect as is obtained with use of a plurality of car stereo sets, enabling a person in the rear seat, as well as a person or persons in the front seat or seats, fully to enjoy his desired music under his desired conditions by freely operating the car stereo unit.

In the seventh embodiment, one car stereo unit 111 may be set in a desired one out of two or more receptacles. In an eighth embodiment to follow, on the other hand, first and second car stereo units sharing a single stereo switching mechanism in common are disposed severally in two receptacles. When a cassette is set in the second car stereo unit while the first car stereo unit is playing, the first car stereo unit ceases from playing, the cassette inside the first car stereo unit is ejected, and the second car stereo unit starts playing. On the contrary, when a cassette is set in the first car stereo unit while the second car stereo unit is playing, the second car stereo unit ceases from playing, the cassette inside the second car stereo unit is ejected, and the first car stereo unit starts playing.

Figure 21:
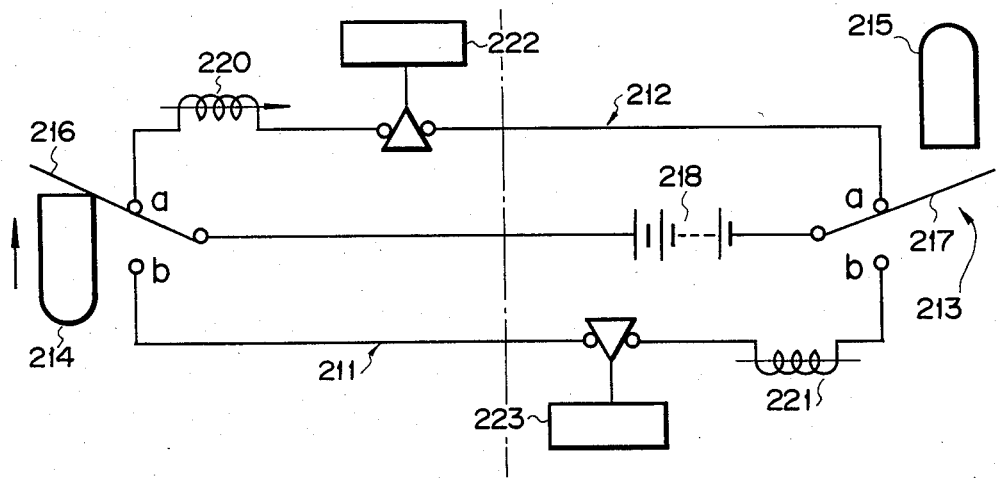
FIGS. 21 to 23 are operating diagrams of a stereo switching mechanism included in a car stereo set according to an eighth embodiment of the invention.
Figure 22:
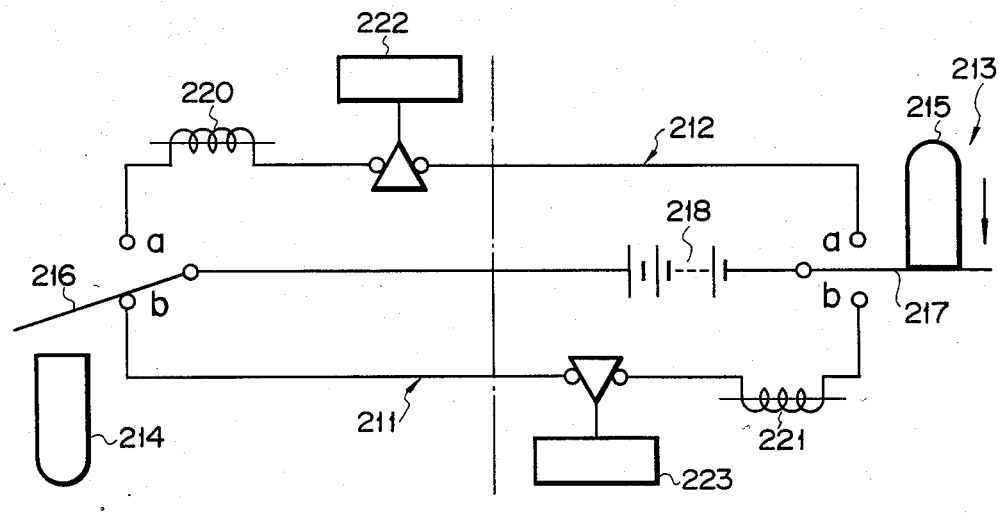
Figure 23:
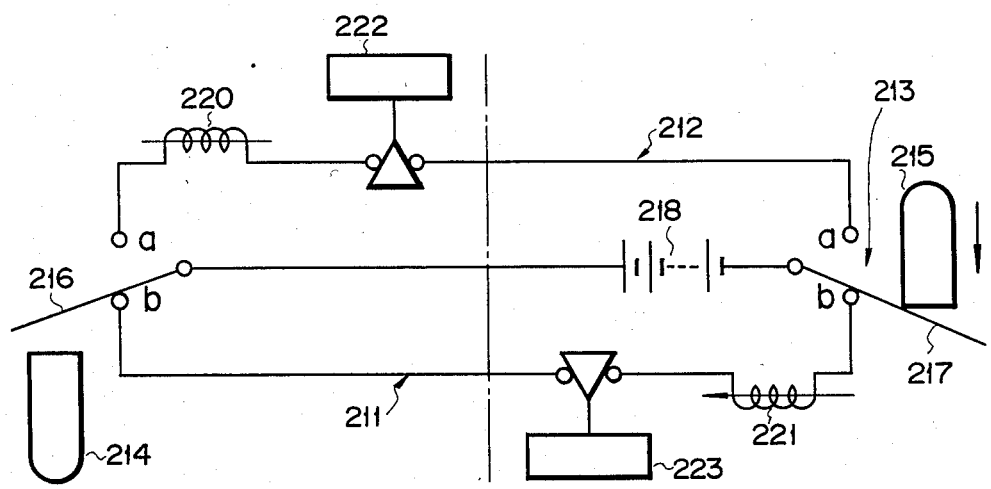

FIGS. 21 to 23 show a stereo switching mechanism 213 attached to the first and second car stereo units 211 and 212. In each of these drawings, the car stereo units 211 and 212 are on the left and right of a chain line in the center, respectively. In FIG. 21, a cassette tape 214 is set in the car stereo unit 211 to turn a changeover switch 216 to the a side, thereby allowing the car stereo unit 211 to play. When a cassette tape 215 is inserted into the car stereo unit 212 to remove a changeover switch 217 from the a side, an electric circuit including a power source 218 and a solenoid 220 opens to cut off the solenoid 220 from power supply. Accordingly, the changeover switch 216 is transferred to the b side to cause the cassette tape 214 to be automatically ejected. When the cassette tape 215 is further inserted and set in place, the changeover switch 217 is turned to the b side, and an electric circuit including the power source 218 and a solenoid 221 is closed to energize the solenoid 221. Then, the cassette tape 215 is held, and the car stereo unit 212 starts playing. The cassette tape 215 may be ejected while the car stereo unit 212 is playing by depressing an eject button 223 to open the electric circuit, thereby de-energizing the solenoid 221. If the cassette tape 214 is set in the car stereo unit 211 while the car stereo unit 212 is playing, the changeover switch 216 is removed from the b side to open the electric circuit including the power source 218 and the solenoid 221. Then, the solenoid 221 is cut off from power supply, so that the cassette tape 215 is ejected automatically. If the cassette tape 214 is further inserted and set in place to turn the changeover switch 216 to the a side, the solenoid 220 is energized to recover the state shown in FIG. 21 for the start of the playing of car stereo unit 211. The cassette tape 214 can easily be ejected while the car stereo unit 211 is playing by depressing an eject button 222 to de-energize the solenoid 220.

Figure 24:
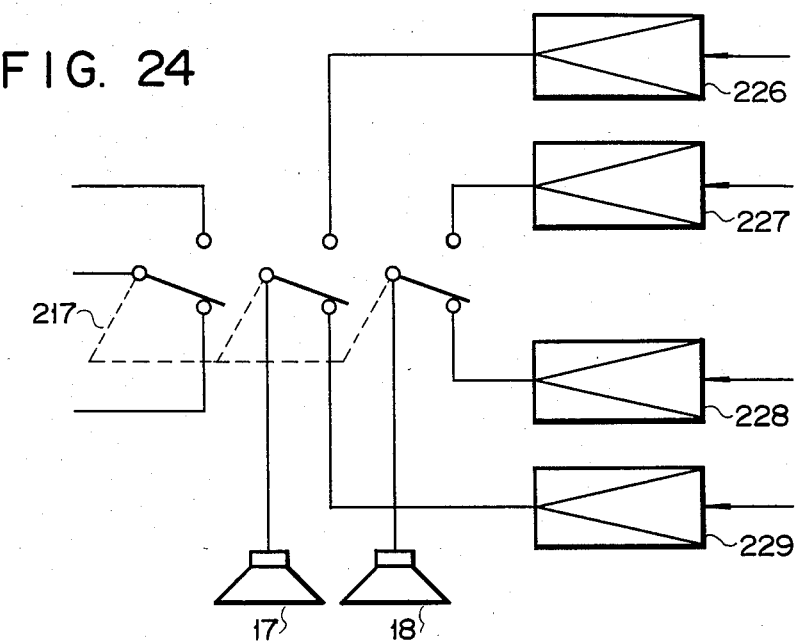
FIG. 24 is an electric circuit diagram for the car stereo set of the eighth embodiment including common speakers.
Figure 25:
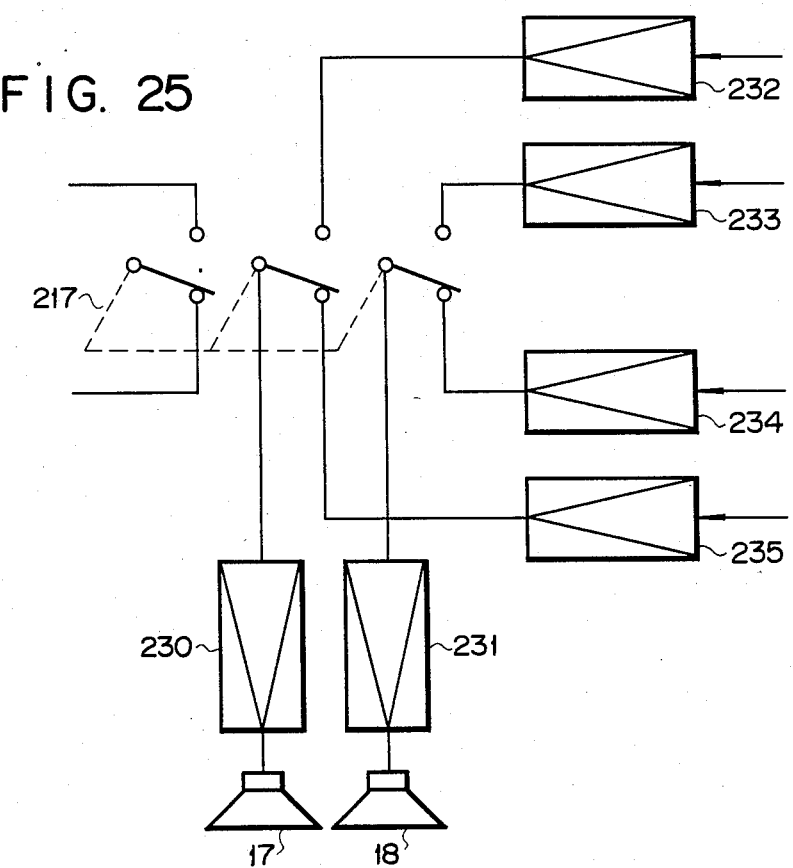
FIG. 25 is an electric circuit diagram similar to FIG. 24 including common speakers with main amplifiers.

Preferably, one of the changeover switches, e.g., the changeover switch 217, is formed in a three-pole two-circuit configuration so that common speakers 17 and 18 may be switched between amplifiers 226 and 227 of the car stereo unit 221, and amplifiers 228 and 229 of the car stereo unit 212, as shown in FIG. 24. Besides the speakers 17 and 18, main amplifiers 230 and 231 for common use may be switched between preamplifiers 232 and 233 of the car stereo unit 211, and preamplifiers 234 and 235 of the car stereo unit 212 by means of the three-pole two-circuit changeover switch 217, as shown in FIG. 25. Thus, the common use of the speakers with or without the main amplifiers simplifies the circuit configuration.

Figure 26:
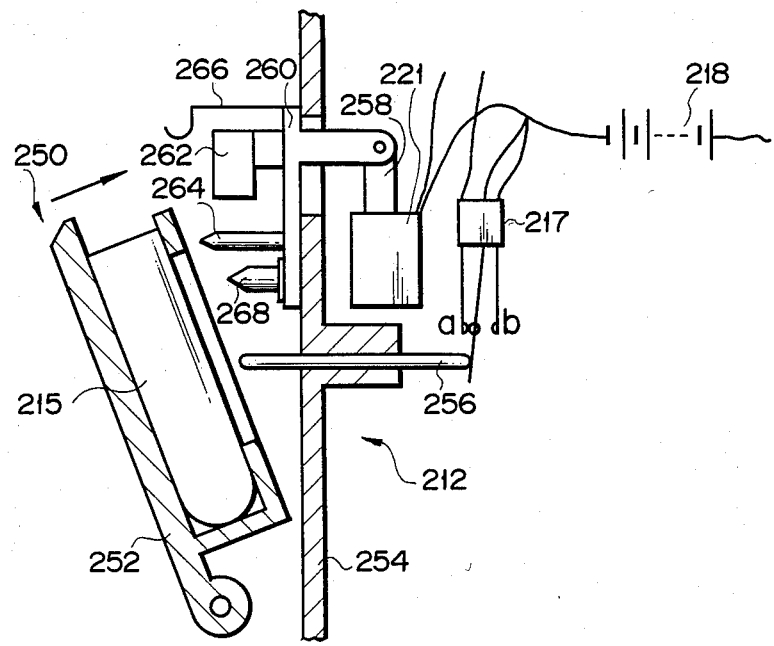
FIGS. 26 and 27 are side views of a stereo switching mechanism.
Figure 27:
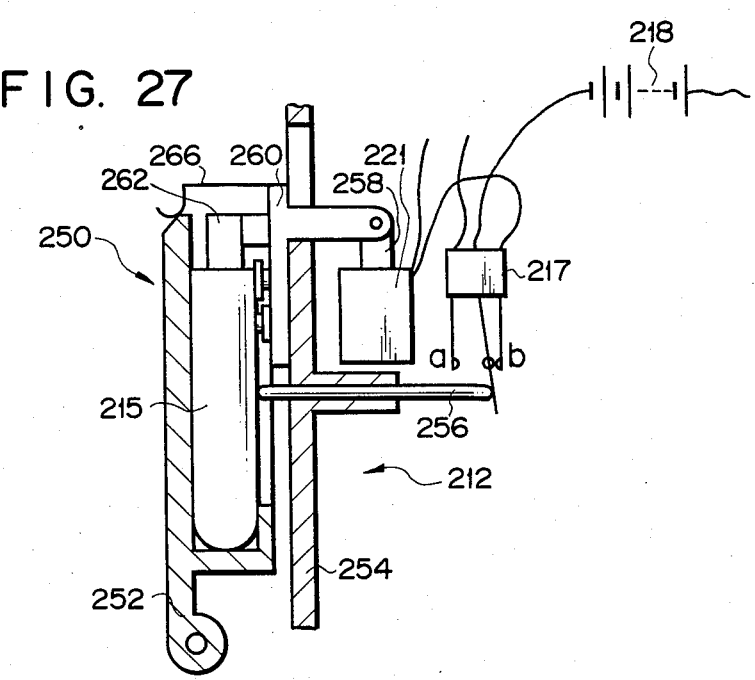

FIG. 26 shows another car stereo switching mechanism 250 applied to a tape recorder mechanism of a kangaroo-pocket system in which the cassette holder is swung to a predetermined position after a cassette tape is set in the cassette holder. Although the construction of the car stereo unit 212 only is shown in FIG. 26, it is to be understood that the other car stereo unit 211 is constructed in like manner. In the car stereo switching mechanism 250, when a cassette holder 252 loaded with the cassette tape 215 is turned clockwise to its normal position, a side of the cassette tape 215 presses against a slide pin 256 on a chassis 254 to transfer the changeover switch 217 from the a side to the b side (see FIG. 27). When the changeover switch 217 is turned to the b side, the solenoid 221 is energized to attract a plunger 258, so that a slide plate 260 coupled with the plunger 258 is drawn toward the cassette tape 215. Thus, a magnetic head 262 abuts against a tape (not shown), the tape is held between a pinch roller (not shown) and a capstan 264, and the car stereo unit 212 starts playing. The cassette holder 252, which is subject to counterclockwise biasing force of a torsion spring (not shown), is held in a predetermined position by a leaf spring 266 on the slide plate 260, and the cassette tape 215 is positioned in place by a pair of guide pins 268 (only one shown). Whereas the stereo switching mechanism 213 is arranged so that the cassette tape 215 can be ejected only by means of the eject button 223, the stereo switching mechanism 250 is arranged so that the cassette tape 215 may be held together with the cassette holder 252 until another cassette tape 214 is set in the car stereo unit. The stereo switching mechanism 250 is suited to fragile cassettes such as micro-cassettes, resembling the stereo switching mechanism 213 in circuit configuration. When the cassette tape 214 is set in the car stereo unit 211 and the associated cassette holder is turned to the normal position, the same action as described in connection with the stereo switching mechanism 213 occurs, and the cassette tape 215 is pushed together with the cassette holder 252 by the slide pin 256 to be returned to the eject position.

Although the solenoid is utilized in this embodiment, it is to be understood that the same effect may be obtained with use of any other suitable member.

According to the eighth embodiment, as described above, the first and second car stereo units are severally disposed in separate positions inside the same car. If a cassette tape is set in the second car stereo unit while the first car stereo unit is playing, the first car stereo unit ceases from playing, the cassette tape inside the first car stereo unit is ejected, and the second car stereo unit starts playing. On the other hand, if a cassette tape is set in the first car stereo unit while the second car stereo unit is playing, the second car stereo unit ceases from playing, the cassette tape inside the second car stereo unit is ejected, and the first car stereo unit starts playing. Thus, the user can freely operate a car stereo unit within his reach to enjoy stereo performances wherever the user is within the car. In operation, moreover, the user will be required only to set a cassette tape in his desired car stereo unit without switching off the other car stereo unit or ejecting another cassette tape in the middle of an operation. Further, with car stereo units attached to the dashboard and the side wall beside the driver, for example, the driver can quickly and easily utilize both these car stereo units without becoming careless in driving due to setting of the cassette tape and other necessary operations. If the car stereo units are disposed in the dashboard and the rear parcel tray, for example, the user can fully enjoy the car stereo set through easy operations, whether he is in the front seat or in the rear seat.

Figure 28:
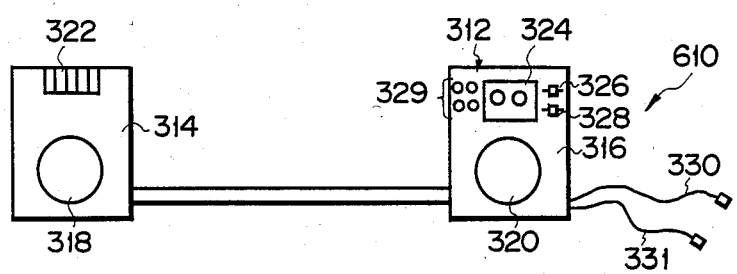
FIG. 28 is a front view of a car stereo set according to a ninth embodiment of the invention.

FIG. 28 shows a car stereo set according to a ninth embodiment which further has such an advantage that it can easily be installed by the owner of the car, himself. In the car stereo set according to the ninth embodiment, a tape recorder mechanism, main amplifiers, preamplifiers, etc. are separately incorporated in a pair of speaker boxes. The speaker boxes can be electrically connected with each other, and power cords extend from one of the speaker boxes. In a car stereo set 610 according to this embodiment, as shown in FIG. 28, main amplifiers (see FIG. 30) and a tape recorder mechanism 312 are disposed in speaker boxes 314 and 316, respectively. Speakers 318 and 320 are contained in their corresponding speaker boxes 314 and 316, and a heat sink 322 for the main amplifiers is attached to the speaker box 314. A tape holder 324 of the tape recorder mechanism 312 protrudes from the front of the speaker box 316, and a volume knob 326, a balance knob 328, and various control buttons 329 (eject button, FF button, REW button and channel changing button) are arranged on the front of the speaker box 316. The speaker boxes 314 and 316 are connected by means of an electric wire, and a pair of power cords 330 and 331 extend from the speaker box 316.

The tape recorder mechanism 312 will not herein be described in detail because it has the same construction as the tape recorder mechanism 16 of the foregoing embodiments.

Figure 29:
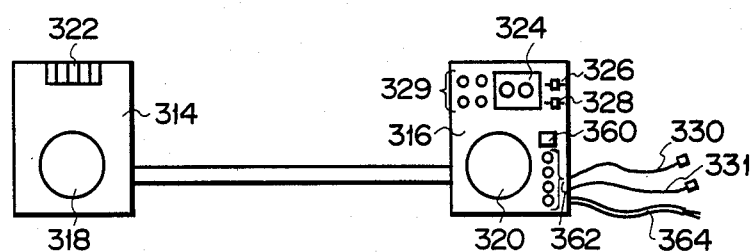
FIG. 29 is a front view of a modification of the car stereo set shown in FIG. 28.

In the car stereo set 610, as shown in FIG. 29, a car radio mechanism may further be incorporated in one speaker box, e.g. the speaker box 316. In this case, a tuning indicator section 360 of a tuner and various tuner control buttons 362 are arranged on the front of the speaker box 316, and an antenna wire 364 extends from the speaker box 316.

Figure 30:
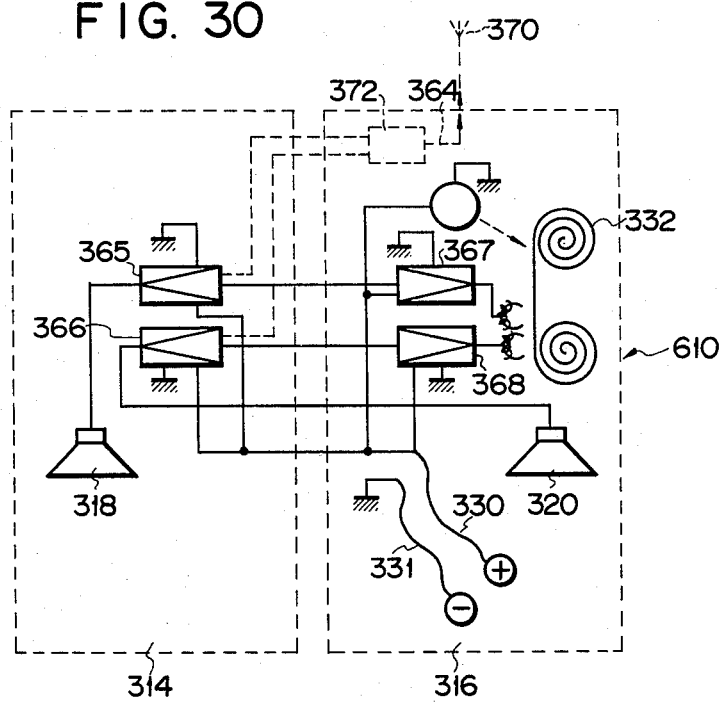
FIG. 30 is an electric circuit diagram for the car stereo set shown in FIG. 28.

Electric circuits in the car stereo set 610 of FIG. 29 inside the speaker boxes 314 and 316 are constructed as shown in FIG. 30. A pair of main amplifiers 365 and 366 are disposed in the speaker box 314, and a pair of preamplifiers 367 and 368 are disposed in the speaker box 316. Further, a tuner 372 having one end connected to the main amplifiers 365 and 366 and the other end arranged to be connected with an antenna 370 by means of the antenna wire 364, is disposed in the speaker box 316.

Thus, in the car stereo set 610 according to the ninth embodiment, the preamplifiers, main amplifiers, and tape recorder mechanism are separately disposed in the speaker boxes 314 and 316 in advance in a suitable manner. Therefore, the car stereo set 610 can very easily be installed by connecting the power cords (example of FIG. 28) or the power cords and antenna wire (modified example of FIG. 29) with their corresponding connectors disposed inside the car.

Figure 31:
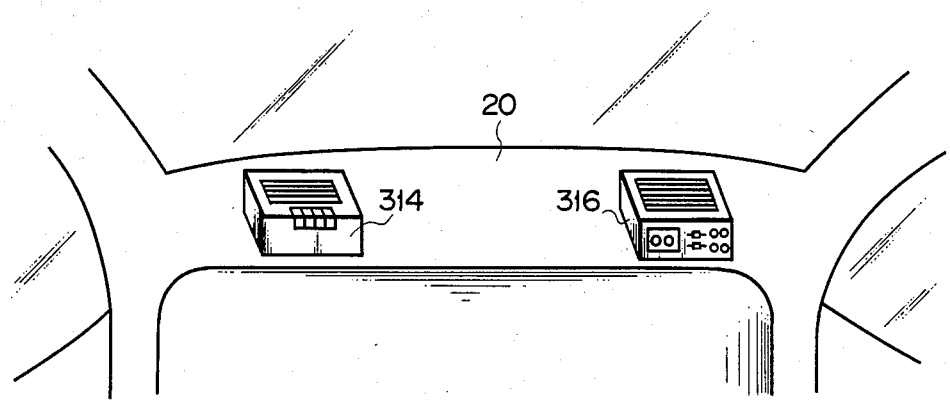
FIG. 31 is a schematic view of the interior of a car in which a pair of speaker boxes are disposed on the rear parcel tray.

The speaker boxes 314 and 316 of the car stereo set 610 may be mounted on the rear parcel tray 20 (FIG. 31), front roof (not shown) or front doors.

According to the ninth embodiment, as stated above, the tape recorder mechanism, main amplifiers, preamplifiers, etc. are separately incorporated in the pair of speaker boxes. These speakers are electrically connectible with each other, and the power cords extend from one of them. Thus, the electric wiring of the car stereo set can be completed by only electrically coupling the speaker boxes with each other and connecting the power cords to the power circuit of the car. Accordingly, the owner of the car can, by himself easily make the wiring arrangement of the car stereo set without any special electrical knowledge, enjoying free installation of the set in a desired position. Moreover, the car radio mechanism can be incorporated in one of the speaker boxes. In this case, simple connection of the antenna wire extending from the speaker box with the antenna connector, will provide a car stereo set capable of receiving FM broadcasts.

Figure 32:
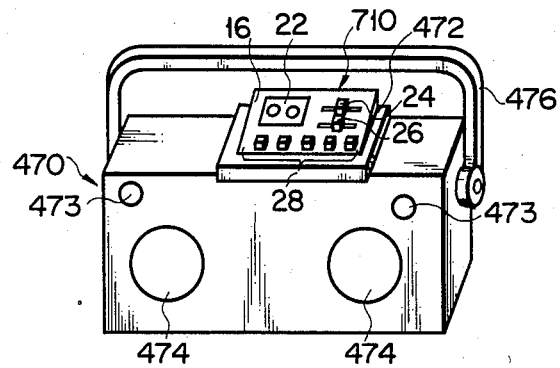
FIGS. 32, 33 and 35 are perspective views showing practical applications of a car stereo set according to a tenth embodiment of the invention.

FIG. 32 shows a unit-type car stereo set according to a tenth embodiment which can be used outside as well as inside the car.

In FIG. 32, a car stereo set 710 has the same construction as the car stereo unit 111 shown in FIGS. 18 and 20. The car stereo set 710 is removed from the receptacle 120 by pulling the swingable handle 132, and may be combined with a unit 470 into the form of a radio-cassette. The unit 470 has a receptacle 472 to receive the car stereo unit 710, including a fixed connector unit connected with a built-in power source and speakers in such configuration as shown in FIG. 18. The unit 470 is provided with a woofer 474 and a tweeter 473 located opposite to the speakers. The unit 470 is further provided with a swingable handle 476 for conveyance. Thus, by incorporating the car stereo unit 710 removed from the receptacle 120 inside the car into the unit 470, the user will be able to enjoy stereo broadcasts both inside and outside the car.

Figure 33:
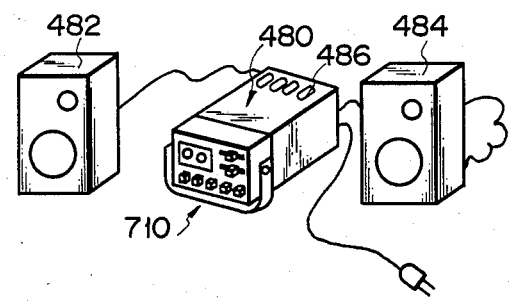

FIG. 33 shows an example in which the car stereo unit 710 is incorporated in a unit 480 which contains a power source section as well as fixed terminals. In this example, an AC power source may also be utilized, and a pair of speaker boxes 482 and 484 are previously coupled to the unit 480. Ventilating holes 486 for radiation of heat are formed in the top face of the unit 480.

Figure 34:
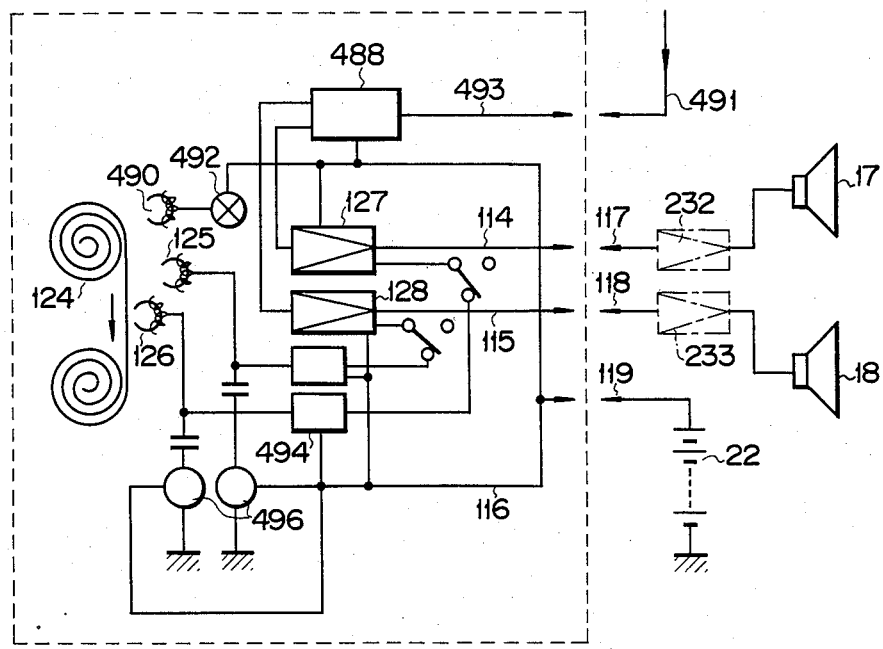
FIG. 34 is an electric circuit diagram for the car stereo set shown in FIGS. 32, 33 and 35.

As shown in FIG. 34, moreover, the car stereo unit 710 of this tenth embodiment may include a tuner 488 of a car radio mechanism, as well as an erasing head 490, an erasing current oscillator 492, an equalizer circuit 494, and an AC bias oscillator circuit 496. The car stereo unit 710 is further provided with a connector 493 for coupling the stereo tuner 488 and an antenna wire 491. FIG. 34 shows a recording mode. Thus, fitted with the stereo tuner 488, the car stereo unit 710 may serve as a stereo set with tuner, a stereo radio-cassette, and a cassette tape recorder with tuner.

Figure 35:
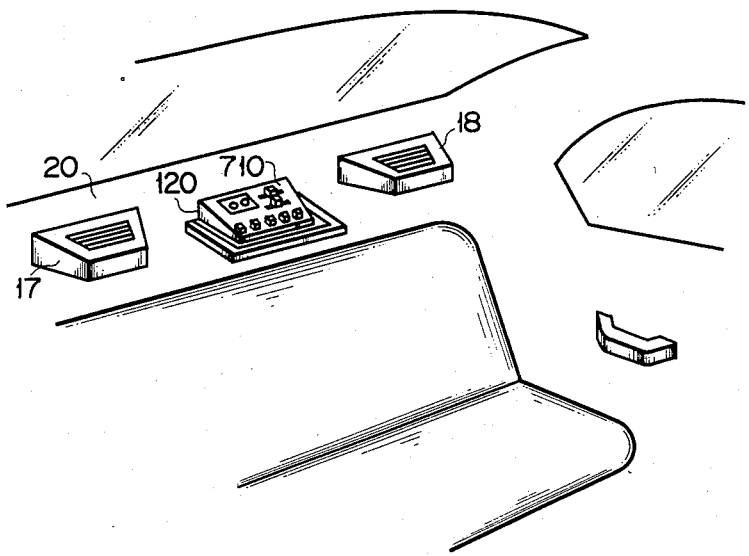

FIG. 35 shows an example in which the car stereo unit 710 is set in the receptacle 120 in the rear parcel tray 20. With such arrangement, a person sitting in the rear seat can freely enjoy stereo performances.

The speaker connectors 117 and 118 may be coupled to the speakers 17 and 18 via the preamplifiers 232 and 233, as indicated by a chain line in FIG. 34.

As described above, the car stereo unit according to the tenth embodiment of the invention is removably fitted in the receptacle in the car. Further, the car stereo unit includes connectors for the power source and speakers which can be connected respectively with fixed connectors disposed in the receptacle inside the car and coupled respectively with the power source and the speakers through the main amplifiers, the speaker connectors being coupled with the speakers directly or through the preamplifiers. Accordingly, by inserting the car stereo unit into the receptacle, the connectors of the car stereo unit are connected to their corresponding fixed connectors, and the car stereo unit is allowed to give a stereo performance by means of the speakers and power source in the car. Removed from the receptacle in the car, the car stereo set can be carried by the user who intends to enjoy stereo performances outside the car, e.g. in the open air or in a room, with separate provisions of speakers and power source. A high-convertibility music tape can be made by using the car stereo unit in combination with an FM radio or record player, without independently using a home cassette deck or radio-cassette. Thus, the car stereo unit may enjoy a widened range of applications, so that the user need not provide himself separately with the home cassette deck or radio-cassette, and can minimize expenditure. As is well known, there are many instances where windows of cars are broken in the night and car stereo sets are pilfered from the cars. Capable of being removed from the car and stored in a room, however, the car stereo set according to the tenth embodiment of the invention may be protected from such accidents. Further, addition of a built-in tuner or recording circuit will enable the user freely to make various music tapes by using the car stereo unit only. Furthermore, optimum conditions can be obtained as required by previously providing the car stereo set with a number of suitable main amplifiers so that these main amplifiers may be selected for their respective applications. In a room, for example, there may be selected a medium-output main amplifier which is subject to less distortion; a high-output amplifier in the open air and a low-output amplifier in a car. If necessary, a graphic equalizer may be combined with the car stereo set.

What is claimed is:

1. In a car stereo set for an automobile having a front and a rear seat, said rear seat having a substantially central recess and substantially central armrest which is movable into and out of said recess of said rear seat, said substantially central armrest having a portion which is selectively hidden from view when said armrest is in said recess of said rear seat, said armrest portion having an upper surface directed toward the ceiling of the automobile when said armrest is out of said recess of said rear seat, the improvement comprising:

a car stereo set installed in said armrest, said stereo set comprising a portion having control knobs and a tape recorder mechanism having an operating portion incluidng a cassette loading chamber, said control knobs and cassette loading chamber being exposed on said upper surface of said portion of said armrest;

at least one openable cover means covering both said portion having said control knobs and said operating portion of said tape recorder mechanism, including said cassette loading chamber, said cover means presenting a flat surface, free of projecting knobs, at said upper surface of said armrest when said cover means is closed, said cover means permitting access to said control knobs and cassette loading chamber when opened;

wherein said car stereo set including said control knobs and operating portion of said tape recorder mechanism is hidden from view when said armrest is in said recess, and wherein a rear seat passenger can access said control knobs and operating portion of said tape recorder mechanism to operate said car stereo set when said armrest is moved out of said recess and said cover means is opened.

2. A car stereo set according to claim 1, wherein said car stereo set further comprises a car radio mechanism combined with said tape recorder mechanism, said radio mechanism including a tuner, a tuning indicator section, and a control section having said control knobs.

3. A car stereo set according to claim 1, wherein said cover means includes a swingable cover for selectively covering said tape recorder mechanism to conceal same from the outside.

4. A car stereo set according to claim 2, wherein said cover means includes a swingable cover for selectively covering at least said control section of said car radio mechanism to conceal same from the outside.

5. A car stereo set according to claim 15, further comprising at least two speakers remote from said armrest; and wherein said armrest comprises a receptacle for removably receiving said car stereo set therein and which can be reached by a person sitting on the rear seat of the car, said receptacle including at least one connector therein which is electrically connected with a power source of the car and to said at least two speakers; said car stereo set including at least one connector for mating with said connector of said receptacle when said car stereo set is inserted into said receptacle for connecting said car stereo set to said power source and to said speakers when said car stereo set is received in said receptacle.

6. A car stereo set according to claim 5, comprising at least one amplifier, and wherein said at least one connector is connected to said speakers via said at least one amplifier.

7. A car stereo set according to claim 5, wherein said at least one connector in said receptacle is fixed in said receptacle.

8. In combination, a car stereo set comprising a tape recorder mechanism, and an armrest which is substantially centrally located in a rear seat of a car, said substantially central armrest being movable into and out of a recess of said rear seat of said car, said substantially central armrest having a portion which is selectively hidden from view when said armrest is in said recess of said rear seat, said armrest portion having an upper surface directed toward the ceiling of the automobile when said armrest is out of said recess of said rear seat; said substantially central armrest having a receptacle therein for receiving said car stereo set, said receptacle opening into said upper surface of said portion of said armrest; said car stereo set being installed in said receptacle of said armrest and comprising a portion having control knobs and a tape recorder mechanism operating portion including a cassette loading chamber which are exposed on said upper surface of said portion of said armrest and at least one openable cover means covering both said portion having said control knobs and said operating portion of said tape recorder mechanism, including said cassette loading chamber, said cover means presenting a flat surface, free of projecting knobs, at said upper surface of said armrest when said cover means is closed, said cover means permitting access to said control knobs and cassette loading chamber when opened; wherein said car stereo set including said control knobs and operating portion of said tape recorder mechanism is hidden from view when said armrest is in said recess, and wherein a rear seat passenger can access said control knobs and operating portion of said tape recorder mechanism to operate said car stereo set when said armrest is moved out of said recess and said cover means is opened.

9. The combination of claim 8, wherein said car stereo set comprises a car radio mechanism combined with said tape recorder mechanism, said radio mechanism including a tuner, a tuning indicating section, and a control section having said control knobs.

10. The combination of claim 8, wherein said cover means includes a swingable cover for selectively covering said tape recorder mechanism to conceal same from the outside.

11. The combination of claim 8, wherein said cover means includes a swingable cover for selectively covering at least said control section of said car radio mechanism to conceal same from the outside.

12. The combination of claim 8, further comprising at least two speakers remote from said armrest; and wherein said receptacle of said armrest includes at least one connector therein which is electrically connected with a power source of the car to said at least two speakers; said car stereo set including at least one connector for mating with said connector of said receptacle when said car stereo set is inserted into said receptacle for connecting said car stereo set to said power source and to said speakers when said car stereo set is received in said receptacle.

13. The combination of claim 12, comprising at least one amplifier, and wherein said at least one connector is connected to said speakers via said at least one amplifier.

14. The combination of claim 5, wherein said at least one connector in said receptacle is fixed in said receptacle.

* * * * *

UNITED STATES PATENT AND TRADEMARK OFFICE
CERTIFICATE OF CORRECTION

PATENT NO. : 4,501,013

DATED : February 19, 1985

INVENTOR(S) : Masaaki SATO

It is certified that error appears in the above-identified patent and that said Letters Patent is hereby corrected as shown below:

Column 5, line 3, "of a associated control" should read
--of a plurality of associated control--

Column 11, line 46, "incluidng" should read --including--

Column 12, line 12, "according to claim 15" should read
--according to claim 1--.

Signed and Sealed this

Seventeenth Day of September 1985

[SEAL]

Attest:

Attesting Officer

DONALD J. QUIGG

Commissioner of Patents and
Trademarks—Designate